United States Patent
Kikuchi et al.

(10) Patent No.: US 7,611,788 B2
(45) Date of Patent: Nov. 3, 2009

(54) FUEL CELL STACK

(75) Inventors: Hideaki Kikuchi, Kawachi-gun (JP);
Masaaki Sakano, Utsunomiya (JP);
Yasuhiro Watanabe, Kawaguchi (JP);
Satoshi Tanimoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 309 days.

(21) Appl. No.: 11/595,570

(22) Filed: Nov. 9, 2006

(65) Prior Publication Data

US 2007/0154758 A1    Jul. 5, 2007

(30) Foreign Application Priority Data

Nov. 11, 2005    (JP)    ............... 2005-327090

(51) Int. Cl.
*H01M 8/04* (2006.01)
*H01M 8/00* (2006.01)
*H01M 2/14* (2006.01)

(52) U.S. Cl. .................. 429/26; 429/12; 429/38; 429/39

(58) Field of Classification Search ............... None
See application file for complete search history.

(56) References Cited

U.S. PATENT DOCUMENTS

2002/0058177 A1* 5/2002 Nishiyama et al. ............. 429/35
2002/0182474 A1* 12/2002 Saito ............................ 429/38
2004/0106028 A1* 6/2004 Sugiura et al. ................ 429/26

FOREIGN PATENT DOCUMENTS

JP    2004-193110    7/2004

\* cited by examiner

*Primary Examiner*—Dah-Wei D Yuan
*Assistant Examiner*—Adam A Arciero
(74) *Attorney, Agent, or Firm*—Lahive & Cockfield, LLP; Anthony A. Laurentano

(57) ABSTRACT

This fuel cell stack includes: a coolant-supplying penetration hole and a coolant-discharging penetration hole each communicating with a coolant passage and each penetrates unit fuel cells in a stacking direction. A coolant-supplying penetration hole and a coolant-discharging penetration hole are arranged in a horizontal direction opposing with each other so as to sandwich a power generating region. The fuel cell stack further includes: an air draining penetration hole communicating with the coolant passage and arranged such that at least one part thereof is located at a higher position than an uppermost position of the coolant passage, and penetrates the unit fuel cells in the stacking direction; and a coolant draining penetration hole communicating with the coolant passage and arranged such that at least one part thereof is located at a lower position than a lowermost position of the coolant passage, and penetrates the unit fuel cells in the stacking direction.

14 Claims, 6 Drawing Sheets

FUEL CELL STACK

BACKGROUND OF THE INVENTION

Priority is claimed on Japanese Patent Application No. 2005-327090, filed Nov. 11, 2005, the contents of which are incorporated herein by reference.

FIELD OF THE INVENTION

The present invention relates to a fuel cell stack formed by stacking a plurality of unit fuel cells.

DESCRIPTION OF THE RELATED ART

There is known a fuel cell having a fuel cell stack formed by stacking a plurality of unit fuel cells (hereinbelow, referred to as "unit cells"). Each of the plate-shaped unit cells is formed by disposing a pair of separators on the both sides of a membrane electrode assembly. The membrane electrode assembly is formed by sandwiching a solid polymer electrolyte membrane between an anode and a cathode.

In this fuel cell, hydrogen ions generated by a catalytic reaction in the anode pass the solid polymer electrolyte membrane and travel to the cathode, where electricity is generated by the electrochemical reaction with the oxygen and water is produced. Since the power generation accompanies heat generation, the fuel cell is normally cooled by a cooler in order to continue the power generation.

As for the cooler, one is known which has coolant passages formed between neighboring separators when stacking the unit cells, in order to cool the fuel cell by supplying coolant through the coolant passages.

In the fuel cell stack provided with such coolant passages, if air remains in the coolant passages, heat-exchange performance will be lowered and thereby affect power generation performance.

In addition, in the case in which: a coolant inlet port and a coolant outlet port each communicating with coolant passages are arranged in the horizontal direction so as to sandwich the coolant passages and opposing with each other; and coolant supplied from the coolant inlet port flows horizontally along the coolant passages to be discharged from the coolant outlet port, if the coolant inlet port and the coolant outlet port are arranged at a middle position in height of the coolant passages, air inside the coolant passages will be drained off hardly.

A fuel cell stack is developed which has an air-draining hole communicating with coolant passages, penetrating in the stacking direction of unit cells, and arranged above the coolant passages (for example, refer to Japanese Unexamined Patent Application, First Publication No. 2004-193110).

However, locating the air-draining hole necessitates avoiding interferences with a reactant gas supplying port, a reactant gas discharging port, a coolant inlet port, and a coolant outlet port; therefore, the location thereof affects the size of the fuel cell stack, and thereby necessitating improvements.

In addition, locating the coolant outlet port at a middle position in height of the coolant passages will make it difficult to completely discharge coolant remaining in the coolant passages during the maintenance.

Thus, the present invention has an object of providing a fuel cell stack which enables, without affecting to size of the fuel cell, discharging substantially whole air within coolant passages, and also discharging substantially whole coolant within the coolant passages in accordance with necessity.

SUMMARY OF THE INVENTION

In order to achieve the above object, the present invention employed the followings.

That is, a fuel cell stack of the present invention includes: a plurality of unit fuel cells stacked with each other, each of the unit fuel cells being formed by disposing separators so as to make close contacts with anodes and cathodes of membrane electrode assemblies, and each of the membrane electrode assemblies being formed by disposing the anode and the cathode on both sides of an electrolyte membrane; a reactant gas passage formed by a space between the separators and the anode and the cathode; a coolant passage formed between the separators by disposing at least one of the separators so as to make a close contact with another of the separators; a reactant-gas-supplying penetration hole and a reactant-gas-discharging penetration hole each communicating with the reactant gas passage and each penetrates the unit fuel cells in a stacking direction thereof; and a coolant-supplying penetration hole and a coolant-discharging penetration hole each communicating with the coolant passage and each penetrates the unit fuel cells in a stacking direction thereof. The coolant-supplying penetration hole and the coolant-discharging penetration hole are arranged in a horizontal direction opposing with each other so as to sandwich a power generating region therebetween. The fuel cell stack further includes: an air draining penetration hole communicating with the coolant passage and arranged such that at least one part thereof is located at a higher position than an uppermost position of the coolant passage, and penetrates the unit fuel cells in the stacking direction; and a coolant draining penetration hole communicating with the coolant passage and arranged such that at least one part thereof is located at a lower position than a lowermost position of the coolant passage, and penetrates the unit fuel cells in the stacking direction.

According to the fuel cell stack, when maintenance is required, the coolant remaining within the coolant passage can be almost completely drained off. In addition, while in an initialization after assembling the fuel cell stack, or while charging the coolant into the coolant passage after draining off the coolant within the coolant passage, it is possible to charge the coolant after almost completely draining off the air remaining within the coolant passage. Accordingly, air will not remain in the coolant passage; therefore, the heat exchanging efficiency will increase, and thereby improving the cooling efficiency. Furthermore, while in the maintenance, since the coolant remaining in the coolant passage of the fuel cell stack can be almost completely drained off, and thereby enabling an easy maintenance work.

It may be arranged such that: the reactant gas supplying penetration hole and the reactant-gas-discharging penetration hole are arranged in the vertical direction opposing with each other so as to sandwich the power generating region therebetween; an upper buffering portion and a lower buffering portion each diffuses and rectifies the reactant gas are disposed between the reactant gas supplying penetration hole and the power generating region, and between the reactant-gas-discharging penetration hole and the power generating region; the coolant-supplying penetration hole and the coolant-discharging penetration hole are arranged between the upper buffering portion and the lower buffering portion; and the air draining penetration hole is located at a higher position that the upper buffering portion, while the coolant draining penetration hole is located at a lower position than the lower buffering portion.

In this case, air-and-liquid separation is performed at the upper buffering portion; therefore, air can be reliably removed from the coolant. The air draining penetration hole can be located above the coolant passage, a coolant-supplying penetration hole, and a coolant-discharging penetration hole; therefore, air-discharging capability can be further improved. In addition, the coolant draining penetration hole can be located under the coolant passage, the coolant-supplying penetration hole, and the coolant-discharging penetration hole; therefore, coolant-discharging capability can be further improved. Accordingly, since air can be reliably discharged from the coolant, the air-discharging capability and the coolant-discharging capability further improve.

It may be arranged such that: each of the upper buffering portion and the lower buffering portion includes an inclining portion inclined with respect to the vertical direction; and each of the air draining penetration hole and the coolant draining penetration hole is disposed around lower ends of the inclining portions.

In this case, the air draining penetration hole can be located further higher, while the coolant draining penetration hole can be located further lower. Accordingly, since the air draining penetration hole can be located at the further higher position, the air-discharging performance can be further improved. In addition, since the coolant draining penetration hole can be located at the further lower position, the coolant-discharging performance can be further improved.

Each of the separators may have a point-symmetric shape.

In this case, the unit fuel cells and the fuel cell stack can be assembled without difficulties even when the separator is set upside-down; therefore, miss-operations during the assembling can be reduced, and thereby improving the productivity. In addition, the number of types of the separators to be manufactured can be reduced; therefore, manufacturing cost thereof can be reduced.

DETAILED DESCRIPTION OF THE INVENTION

One embodiment of the fuel cell stack of the present invention will be explained below with reference to FIGS. 1 to 6. Moreover, a fuel cell stack S of the present embodiment is used for a fuel cell cars.

Figure 1:
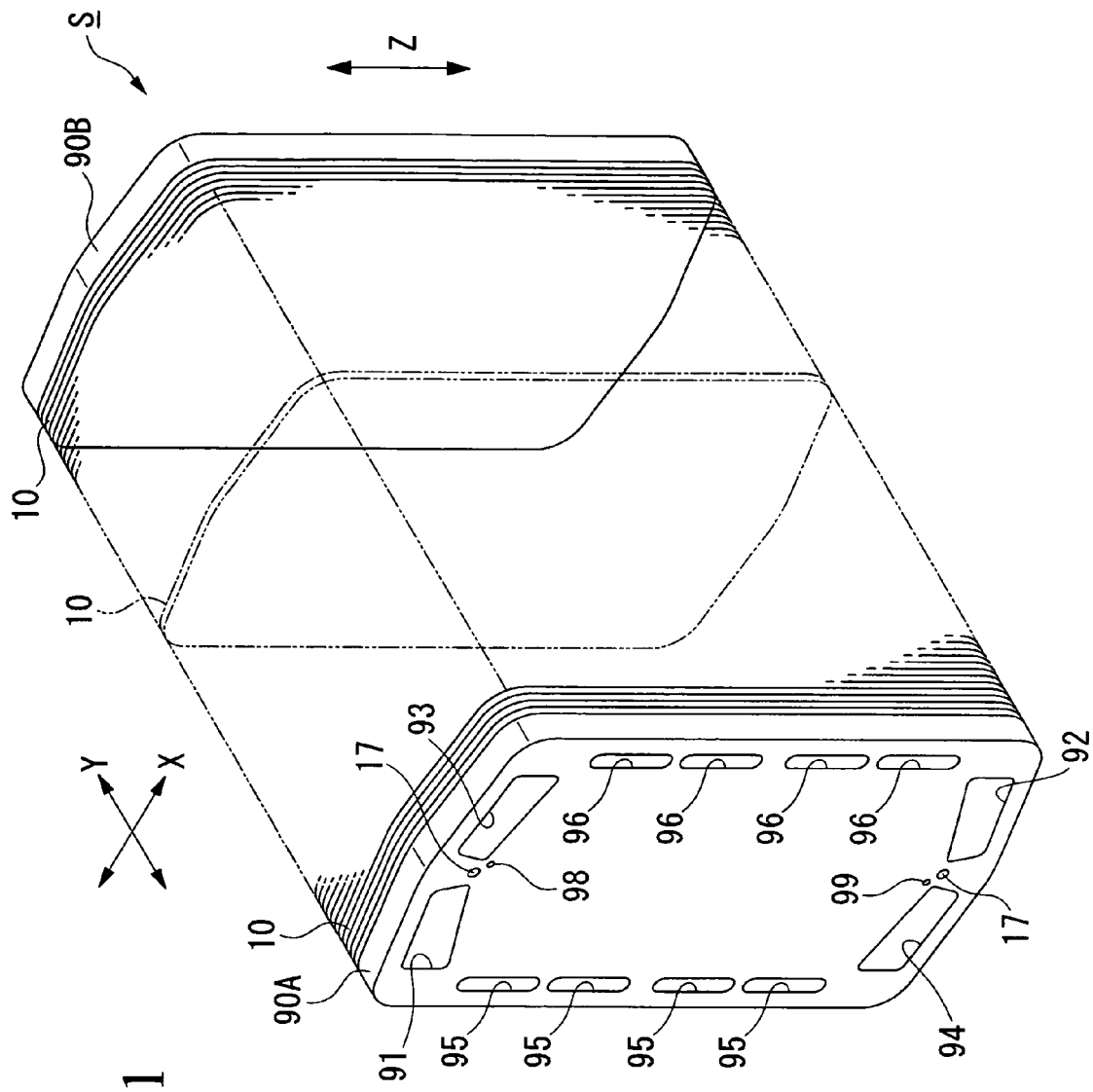
FIG. 1 shows substantially a perspective view of a fuel cell stack of the present invention.

FIG. 1 shows a schematic perspective view of a fuel cell stack S of the present embodiment. The fuel cell stack S is configured by: stacking and electrically connecting in series a number of unit fuel cells (hereinafter "unit cell") 10 each having a narrow shape in the vertical direction; placing end plates 90A and 90B on both sides thereof; and tying them with non-illustrated tie-rods. The fuel cell stack S of the present embodiment is mounted in a vehicle so that the vertical direction thereof directs up and down directions. In the following explanations, reference symbols X and Y denote horizontal directions while a reference symbol Z denotes up and down direction.

Figure 2:
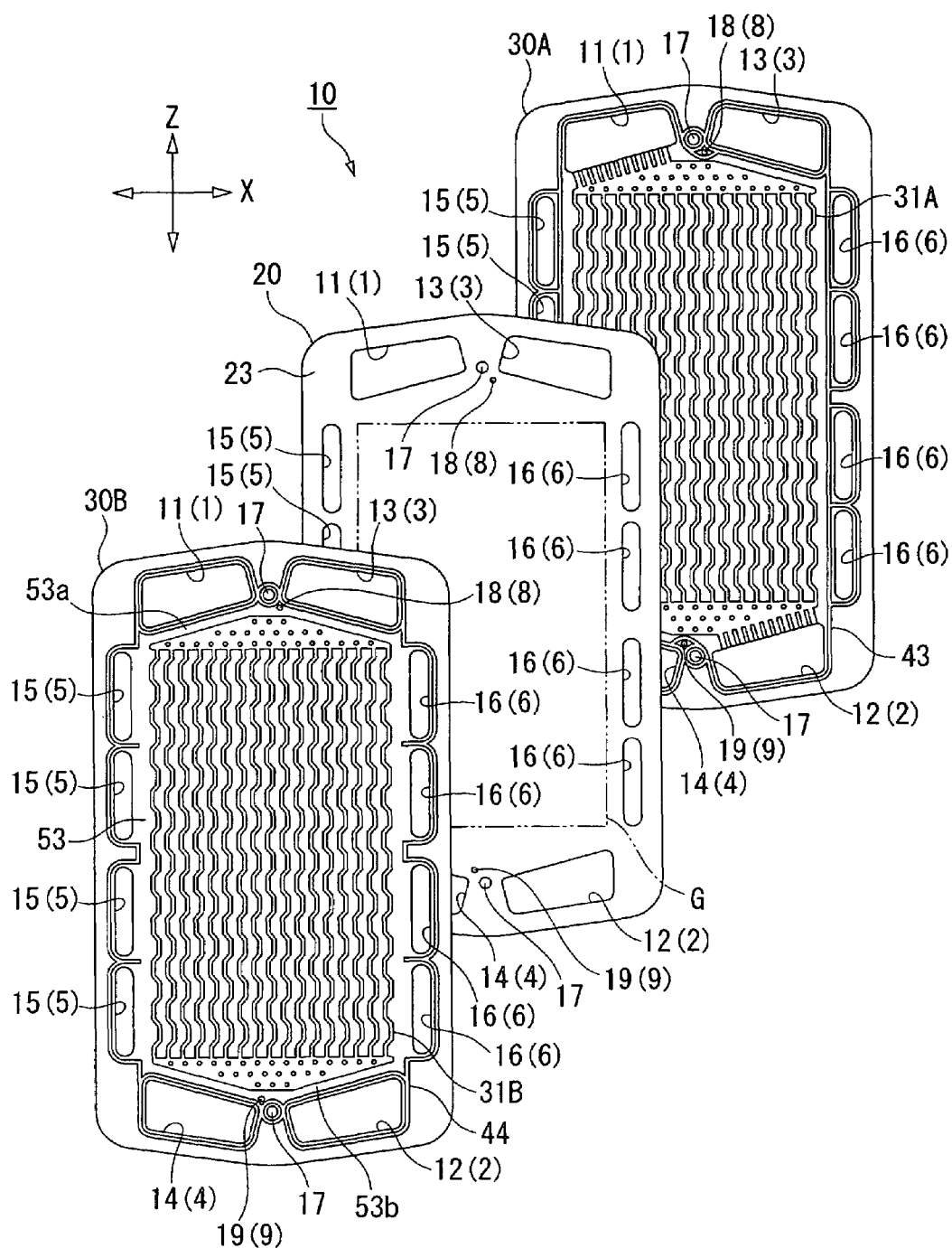
FIG. 2 shows an explored view of a unit fuel cell forming the fuel cell stack.
Figure 5:
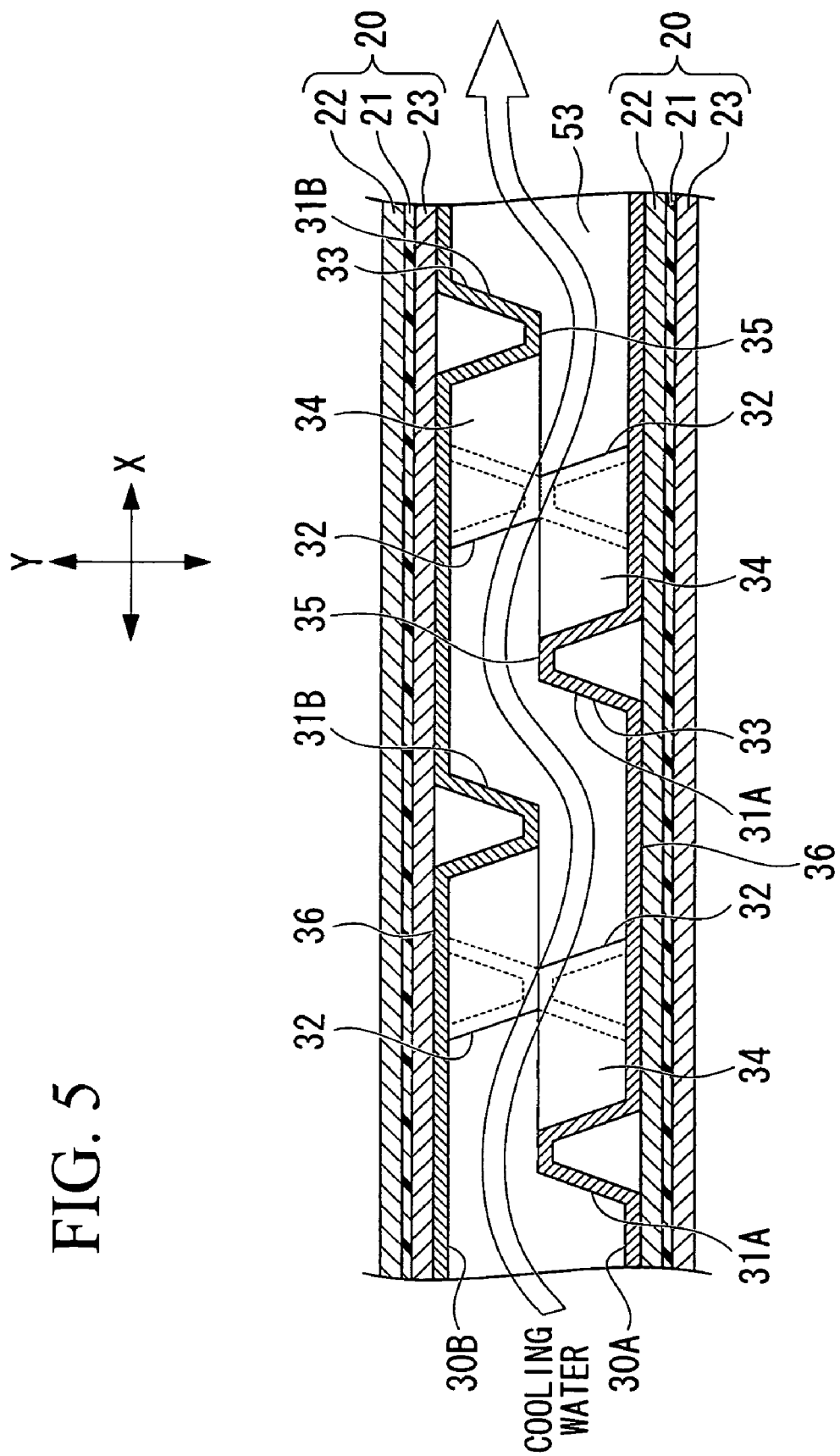
FIG. 5 shows a partial cross sectional view of the fuel cell stack.

As shown in FIG. 2, the unit cell 10 has a sandwich-construction in which a membrane electrode assembly 20 is sandwiched between the separators 30A and 30B. In more detail, the membrane electrode assembly 20 is, as shown in FIG. 5, configured by disposing an anode 22 and a cathode 23 on both sides of a solid polymer electrolyte membrane 1 (an electrolyte membrane) made of for example a fluoro electrolyte membrane or the like. Furthermore, an anode side separator 30A is arranged so as to face the anode 22 of the membrane electrode assembly 20, and a cathode side separator 30B is arranged so as to face the cathode 23 of the membrane electrode assembly 20. Both of the anode side separator 30A and the cathode side separator 30B are formed by press working a metal plate into a specified shape. In the fuel cell stack S formed by stacking the unit cells 10, between the neighboring unit cells 10, the anode side separator 30A attached to one of them makes a close contact with the cathode side separator 30B attached to the another.

As shown in FIG. 2, fuel gas supplying ports 11 are formed in the membrane electrode assembly 20, the anode side separator 30A, and the cathode side separator 30B, at left and up corners thereof so that unreacted fuel gas (for example, hydrogen) passes therethrough, while anode offgas discharging ports 12 are formed at right and down corners being diagonal positions of the left and up corners so that reacted fuel gas (hereinbelow "anode offgas") passes therethrough. In the same manner, oxidant gas supplying ports 13 are formed on the membrane electrode assembly 20, the anode side separator 30A, and the cathode side separator 30B at right and up corners thereof so that unreacted oxidant gas passes therethrough, while cathode offgas discharging ports 14 are formed at left and down corners being diagonal positions of the right and up corners so that reacted oxidant gas (hereinbelow "cathode offgas") passes through. Furthermore, four cooling water supplying ports 15 are formed in series along the vertical direction on the left side of the membrane electrode assembly 20, the anode side separator 30A, and the cathode side separator 30B, at left end portions thereof so that unused cooling water passes therethrough, while four cooling water discharging ports 16 are formed in series along the vertical direction at right end portions (i.e., symmetric positions with respect to those of the cooling water supplying ports 15) so that used cooling water passes therethrough. The cooling water supplying ports 15 and the cooling water discharging ports 16 are located at lower positions than the fuel gas supplying port 11 and the oxidant gas supplying ports 13. Furthermore, the cooling water supplying ports 15 and the cooling water discharging ports 16 are located at higher positions than the anode offgas discharging port 12 and the cathode offgas discharging port 14.

In addition, tie-rod penetration holes 17 for inserting tie-rods which tie the fuel cell stack S are formed at a position between the fuel gas supplying port 11 and the oxidant gas supplying port 13, and a position between the anode offgas discharging port 12 and the cathode offgas discharging port 14.

Air draining holes 18 are formed in the membrane electrode assembly 20 and in both of the separators 30A and 30B at positions adjacent to and below the oxidant gas supplying port 13 and the tie-rod penetration holes 17 on the upper side. In addition, cooling water draining holes 19 are formed in the membrane electrode assembly 20 and in both of the separators 30A and 30B at positions adjacent to and above the cathode offgas discharging port 14 and the tie-rod penetration hole 17 on the lower side. The air draining holes 18 and the cooling water draining holes 19 are positioned at point-symmetric positions with each other centering on centers of the membrane electrode assembly 20 and the separators 30A and 30B.

When assembling the unit cell 10 (i.e., when assembling the fuel cell stack S), at between the membrane electrode assembly 20 and the separators 30A and 30B, each of the fuel gas supplying ports 11, the anode offgas discharging ports 12, the oxidant gas supplying ports 13, the cathode offgas discharging ports 14, the cooling water supplying ports 15, the cooling water discharging ports 16, the air draining holes 18, and the cooling water draining holes 19 will communicate with each other via sealing members 43 and 44 (to be explained later), and thereby forming a communication hole 1 for supplying fuel gas (a reactant gas supplying penetration hole), a communication hole 2 for discharging anode offgas (a reactant-gas-discharging penetration hole), a communication hole for supplying oxidant gas 3 (a reactant gas supplying penetration hole), a communication hole for discharging cathode offgas 4 (a reactant-gas-discharging penetration hole), a communication holes 5 for supplying cooling water (a coolant-supplying penetration hole), a communication holes 6 for discharging cooling water (a coolant-discharging penetration hole), an air draining penetration hole 8, and a communication hole for draining cooling water 9 (a coolant draining penetration hole). As a result, these will work as branching passages or communicating passages. That is, these communication holes 1 to 6, 8, and 9 are provided so as to be penetrated in the stacking direction of the unit cells 10. These communication hole 1 for supplying fuel gas, communication hole 2 for discharging anode offgas, communication hole for supplying oxidant gas 3, communication hole for discharging cathode offgas 4, communication holes 5 for supplying cooling water, communication holes 6 for discharging cooling water, air draining penetration hole 8, communication hole for draining cooling water 9 will communicate with a fuel gas supplying port 91, a anode offgas discharging port 92, an oxidant gas supplying port 93, a cathode offgas discharging port 94, a cooling water supplying port 95, a cooling water discharging port 96, an air draining hole 98, and a cooling water draining hole 99, each formed in one end plate 90A, and distal ends thereof are closed by another end plate 90B.

The fuel cell stack S is configured such that: fuel gas can be supplied into the fuel gas supplying port 91; oxidant gas can be supplied into the oxidant gas supplying port 93; and cooling water can be supplied into the cooling water supplying ports 95, through non-illustrated manifolds. In addition, the fuel cell stack S is further configured such that each of anode offgas discharged from the anode offgas discharging port 92, cathode off gas discharged from the cathode offgas discharging port 94, and cooling water discharged from the discharging ports 96 is dischargeable through the non-illustrated manifolds.

The air draining hole 98 of the end plate 90A is connected to a cooling water reservoir tank (not illustrated) through a duct (not illustrated), while the cooling water draining hole 99 of the end plate 90A is closed by a plug (not illustrated) except for the time at maintenance or the like.

When assembling the unit cell 10 (i.e., when assembling the fuel cell stack S), the tie-rod penetration holes 17 are also communicated with each other via sealing members 43 and 44 (to be explained later), and are further communicated with the tie-rod penetration hole 17 of the end plate 90A.

Figure 3:
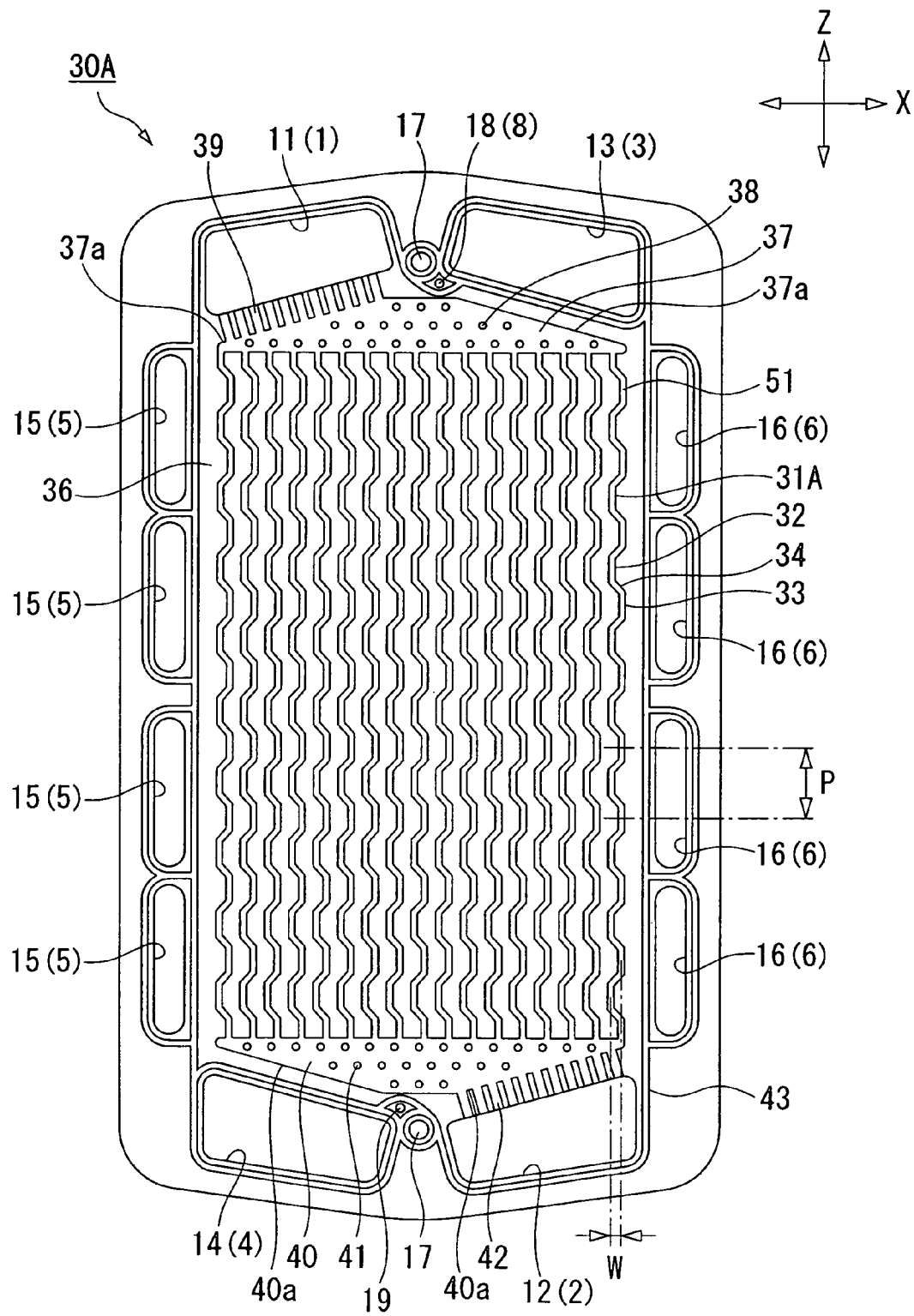
FIG. 3 shows a front view of an anode side separator forming the unit fuel cell.

As shown in FIG. 3, a flat portion 36 which makes a face-contact with the membrane electrode assembly 20 is formed on the anode side separator 30A. Numbers of rails 31A are formed on a rectangular area sandwiched between the cooling water supplying ports 15 and the cooling water discharging ports 16 such that the lengths thereof direct in the vertical direction. These rails 31A protrude so as to be away from the membrane electrode assembly 20, and are arranged parallel with each other so as to have constant gaps therebetween in the horizontal direction (i.e., in the X-direction). Each of the rails 31A extends in the vertical direction while meandering left and right, and thereby forming substantially trapezoidal-wave shapes. In more detail, each of the rails 31A includes first linear portions 32, second linear portions 33, and inclining portions 34. The first linear portions 32 and the second linear portions 33 extend linearly in the vertical direction, and are arranged so as to form a zigzag shape. Each of the inclining portions 34 extends in the inclining direction and thereby connects between the first linear portions 32 and the second linear portions 33. If a gap between centers in the horizontal direction of the first linear portions 32 and the second linear portions 33 of the same rail 31A is denoted as amplitude W, and if a gap between centers in the vertical direction of the first linear portions 32 and the second linear portions 33 adjoining with each other, of the same rail 31A is denoted as pitch P, then each of the amplitude W and the pitch P is set to be constant at all of the rails 31A. As shown in FIG. 5, each of the rails 31A has a trapezoidal shape including flat top portions 35 in cross section; and end portions of the adjoining rails 31A are joined with each other by flat portions 36.

An upper buffering portion 37 is formed on the anode side separator 30A at a position under the fuel gas supplying port 11 and the oxidant gas supplying port 13 so as to protrude away from the membrane electrode assembly 20. The upper buffering portion 37 has, in front view, a trapezoidal shape which spreads downward, and has inclining portions 37a which slope upward toward a center in the horizontal direction of the anode side separator 30A. Top ends of the rails 31A communicate with the bottom end of the upper buffering portion 37. Cylindrical-shaped protruding portions 38 protruding toward the membrane electrode assembly 20 are formed so as to be spread on the upper buffering portion 37. Distal end surfaces of the protruding portions 38 have the same height as that of the flat portion 36 of the anode side separator 30A. The fuel gas supplying port 11 and the inclining portion 37a opposing thereto are communicated with each other through numbers of rails 39 formed so as to protrude away from the membrane electrode assembly 20. The above-mentioned air draining hole 18 is arranged at a position near and slightly above the top end (a terminal end) of the inclining portion 37a opposing to the oxidant gas supplying port 13.

A lower buffering portion 40 is formed on the anode side separator 30A at a position above the anode offgas discharging port 12 and the cathode offgas discharging port 14 so as to protrude away from the membrane electrode assembly 20. The lower buffering portion 40 has, in front view, a trapezoidal shape which spreads upward, and has inclining portions 40a which slope downward toward a center in the horizontal direction of the anode side separator 30A. Bottom ends of the rails 31A communicate with the top end of the lower buffering portion 40. Cylindrical-shaped protruding portions 41 protruding toward the membrane electrode assembly 20 are formed so as to be spread on the lower buffering portion 40. Distal end surfaces of the protruding portions 41 have the same height as that of the flat portion 36 of the anode side separator 30A. The anode offgas discharging port 12 and the inclining portion 40a opposing thereto of the lower buffering portion 40 are communicated with each other through numbers of rails 42 formed so as to protrude away from the membrane electrode assembly 20. The above-mentioned cooling water draining hole 19 is arranged at a position near and slightly below the bottom end (a terminal end) of the inclining portion 40a opposing to the cathode offgas discharging port 14.

A sealing member 43 made of insulation resin (for example, silicon resins) is provided on a face of the anode side separator 30A, where makes a close-contact with the membrane electrode assembly 20. The sealing member 43 surrounds the fuel gas supplying port 11, the anode offgas discharging port 12, the upper buffering portion 37, the lower buffering portion 40, and all of the rails 31A, 39, and 42, by running therearound. In addition, the sealing member 43 independently surrounds each of the oxidant gas supplying port 13, the cathode offgas discharging port 14, the cooling water supplying ports 15, the cooling water discharging ports 16, the tie-rod penetration hole 17, the air draining hole 18, and the cooling water draining hole 19.

The anode side separator 30A is attached to the membrane electrode assembly 20 such that the flat portion 36 and the sealing member 43 thereof make close-contacts with the anode 22 of the membrane electrode assembly 20. Anode gas passages 51 where the fuel gas passes through are formed in spaces: between the membrane electrode assembly 20 and the upper buffering portion 37; between the membrane electrode assembly 20 and the lower buffering portion 40; and between the membrane electrode assembly 20 and the rails 31A, 39, and 42. The fuel gas introduced into the anode gas passages 51 through the fuel gas supplying port 11 passes through the rails 39, the upper buffering portion 37, the rails 31A, the lower buffering portion 40, and the rails 42 along this order, and is thereafter discharged into the anode offgas discharging port 12. That is, the fuel gas flows toward the anode 22 of the membrane electrode assembly 20 while meandering in the vertical direction from the top to the bottom.

Meanwhile, since the upper buffering portion 37 has a trapezoidal shape spreading downward and the numbers of the protruding portions 38, the fuel gas introduced into the upper buffering portion 37 from the fuel gas supplying port 11 can be almost uniformly distributed toward all of the rails 31A. Furthermore, since the lower buffering portion 40 has a trapezoidal shape spreading upward and the numbers of the protruding portions 41, the fuel gas introduced into the lower buffering portion 40 from the rails 31A can be rectified and can be gathered toward the anode offgas discharging port 12.

Figure 4:
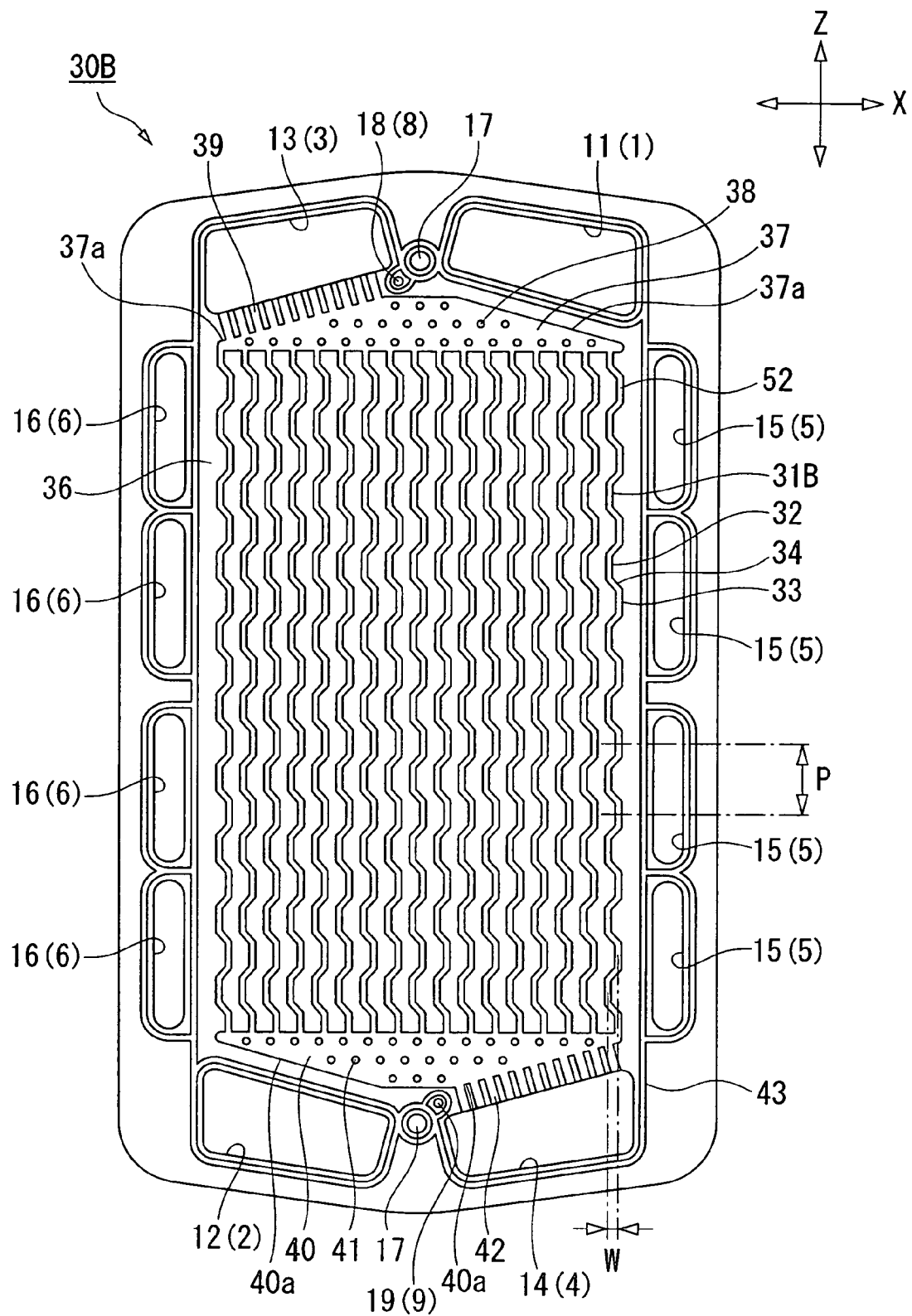
FIG. 4 shows a front view of a cathode side separator forming the unit fuel cell.

The cathode side separator 30B has substantially the same construction as that of the anode side separator 30A; therefore, explanation for the same construction is omitted here and only the deference therebetween will be explained with reference to FIG. 4. Moreover, FIG. 4 shows the cathode side separator 30B seen from a side facing the cathode 23.

When they are seen from the same side as shown in FIG. 2, the rails 31B of the cathode side separator 30B and the rails 31A of the anode side separator 30A have phases which differ from each other (that is, the phases differ from each other about 180 degrees in a sin wave). The amplitude W and the pitch P of the rails 31B of the cathode side separator 30B are set so as to be the same as those of the anode side separator 30A. The oxidant gas supplying port 13 and the inclining portion 37a of the upper buffering portion 37 opposing thereto are communicated with each other through the rails 39. The cathode offgas discharging port 14 and the inclining portion 40a of the lower buffering portion 40 opposing thereto are communicated with each other through the rails 42. The air draining hole 18 is arranged at a position near and slightly above the top end (a terminal end) of the inclining portion 37a of the upper buffering portion 37 opposing to the oxidant gas supplying port 13. The cooling water draining hole 19 is arranged at a position near and slightly below the bottom end of the inclining portion 40a of the lower buffering portion 40 opposing the cathode offgas discharging port 14.

The sealing member 43 of the cathode side separator 30B surrounds the oxidant gas supplying port 13, the cathode offgas discharging port 14, the upper buffering portion 37, the lower buffering portion 40, and all of the rails 31B, 39, and 42, by running therearound. In addition, the sealing member 43 independently surrounds each of the fuel gas supplying port 11, the anode offgas discharging port 12, the cooling water supplying ports 15, the cooling water discharging ports 16, the tie-rod penetration holes 17, the air draining hole 18, and the cooling water draining hole 19.

The cathode side separator 30B is attached to the membrane electrode assembly 20 such that the flat portion 36 and the sealing member 43 thereof make close-contacts with the cathode 23 of the membrane electrode assembly 20. Cathode gas passages 52 where the oxidant gas passes through are formed in spaces: between the membrane electrode assembly 20 and the upper buffering portion 37; between he membrane electrode assembly 20 and the lower buffering portion 40; and between he membrane electrode assembly 20 and the rails 31B, 39, and 42. As a result, the oxidant gas introduced into the cathode gas passages 52 through the oxidant gas supplying port 13 passes through the rails 39, the upper buffering portion 37, the rails 31B, the lower buffering portion 40, and the rails 42 along this order, and is thereafter discharged into the cathode offgas discharging port 14. That is, the oxidant gas flows toward the cathode 23 of the membrane electrode assembly 20 while meandering in the vertical direction from the top to the bottom.

Meanwhile, since the upper buffering portion 37 has a trapezoidal shape spreading downward and the numbers of the protruding portions 38, the oxidant gas introduced into the upper buffering portion 37 from the oxidant gas supplying port 13 can be almost uniformly distributed toward all of the rails 31B. Furthermore, since the lower buffering portion 40 has a trapezoidal shape spreading upward and the numbers of the protruding portions 41, the oxidant gas introduced into the lower buffering portion 40 from the rails 31B can be rectified and can be gathered toward the cathode offgas discharging port 14.

Moreover, as shown in FIG. 2, in this fuel cell stack S, a region of the membrane electrode assembly 20 surrounded by two-dotted line (i.e., a region where is provided with the rails 31A of the anode side separator 30A and the rails 31B of the cathode side separator 30B) will work substantially as a power generating region G.

Accordingly, in this fuel cell stack S, the communication hole 1 for supplying fuel gas and the communication hole 2 for discharging anode offgas opposes in the vertical direction with each other while sandwiching the power generating region G therebetween. In addition, the communication hole for supplying oxidant gas 3 and the communication hole for discharging cathode offgas 4 opposes in the vertical direction with each other while sandwiching the power generating region G therebetween. In addition, the communication holes 5 for supplying cooling water and the communication holes 6 for discharging cooling water opposes in the horizontal direction with each other while sandwiching the power generating region G therebetween.

Furthermore, the upper buffering portion 37 is located at a position surrounded by the communication hole 1 for supplying fuel gas, the communication hole for supplying oxidant gas 3, and the power generating region G In addition, the lower buffering portion 40 is located at a position surrounded by the communication hole 2 for discharging anode offgas, the communication hole for discharging cathode offgas 4, and the power generating region G In addition, the communication holes 5 for supplying cooling water and the communication holes 6 for discharging cooling water are located between the upper buffering portion 37 and the lower buffering portion 40.

The air draining penetration hole 18 is located at a position above the upper buffering portion 37, while the communication hole for draining cooling water 19 is located below the lower buffering portion 40.

In addition, as shown in FIG. 2, a sealing member 44 made of insulation resin (for example, silicon resins) is provided on a face of the cathode side separator 30B, where is on the back side of a face making a close-contact with the membrane electrode assembly 20. The sealing member 44 surrounds the cooling water supplying ports 15, the cooling water discharging ports 16, the air draining hole 18, and the cooling water draining hole 19 by running therearound. In addition, the sealing member 44 independently surrounds each of the fuel gas supplying port 11, the anode offgas discharging port 12, the oxidant gas supplying port 13, the cathode offgas discharging port 14, and the tie-rod penetration holes 17. As same as the cathode side separator 30B, the sealing member 44 is also provided on a back side face of the anode side separator 30A where makes a close contact with the membrane electrode assembly 20.

Moreover, in the present embodiment, each of the anode side separator 30A and the cathode side separator 30B is formed in a point-symmetric shape centering on a center thereof; therefore, the unit cell 10 and the fuel cell stack S can be assembled without difficulties even when the anode side separator 30A and the cathode side separator 30B are set in a upside down positions. Accordingly, miss assembling will be reduced and thereby improving a productivity. Furthermore, it is possible to reduce the types of the separators to be manufactured, and thereby enabling cost reduction thereof.

As mentioned in the above, in the fuel cell stack S formed by stacking the unit cells 10, between the neighboring unit cells 10, the anode side separator 30A attached to one of them makes a close contact with the cathode side separator 30B attached to the another. Meanwhile, the top portions 35 of the first linear portions 32 of the rails 31A on the anode side separator 30A make close contacts with the top portions 35 of the first linear portions 32 of the rails 31B on the cathode side separator 30B. In addition, the upper buffering portion 37 and the lower buffering portion 40 of the anode side separator 30A make close contacts with the upper buffering portion 37 and the lower buffering portion 40 of the cathode side separator 30B. In addition, the sealing member 44 of the anode side separator 30A makes a close contact with the sealing member 44 of the cathode side separator 30B. Thereby, cooling water passages 53 are formed in a space between the anode side separator 30A and the cathode side separator 30B where is surrounded by both of the sealing members 44 and is between the upper buffering portion 37 and the lower buffering portion 40, so as to surround the cooling water supplying ports 15, the cooling water discharging ports 16, and the rails 31A and 31B. In addition, the cooling water will not flow through a space between the upper buffering portions 37 and a space between the lower buffering portions 40; therefore, the coolant (the cooling water) can be efficiently introduced into the power generating region G, and thereby enabling efficient cooling of the power generating region G.

In addition, the air draining hole 18 and the cooling water draining hole 19 communicate with the cooling water passages 53 through a groove 53a formed along the inclining portion 37a of the upper buffering portion 37 and a groove 53b formed along the inclining portion 40a of the lower buffering portion 40. The air draining penetration hole 8 is located at a position higher than the upper most positions of the communication holes 5 for supplying cooling water, the communication holes 6 for discharging cooling water, and the cooling water passages 53, and is positioned at substantially the uppermost position of the groove 53a. In addition, the communication hole for draining cooling water 9 is located at a position lower than the lowermost positions of the communication holes 5 for supplying cooling water, the communication holes 6 for discharging cooling water, and the cooling water passages 53, and is positioned at substantially the lowermost position of the groove 53b.

Figure 6:
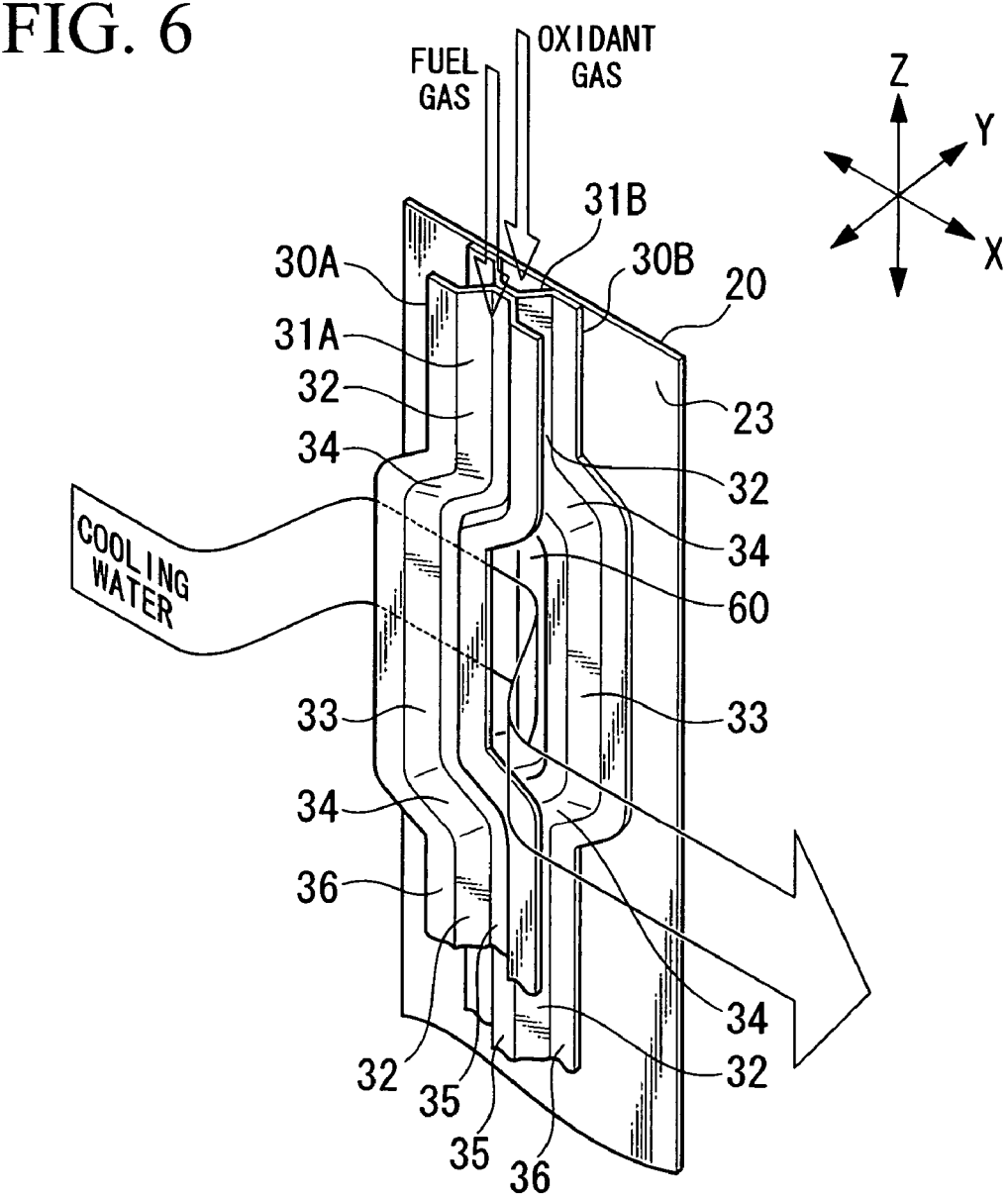
FIG. 6 shows a perspective view of stacked separators of the fuel cell stack.

The details of the cooling water passages 53 will be explained below with reference to FIGS. 5 and 6. Moreover, FIG. 6 representatively illustrates one of the rails 31A of the anode side separator 30A and one of the rails 31B of the cathode side separator 30B.

As has been mentioned in the above, since the rails 31A of the anode side separator 30A and the rails 31B of the cathode side separator 30B have phases which differ from each other, when the top portions 35 of the first linear portions 32 of the rails 31A and the top portions 35 of the first linear portions 32 of the rails 31B are overlapped with each other by making close contacts therebetween, the top portions 35 of the second linear portions 33 of the rails 31A and the top portions of the second linear portions 33 of the rails 31B will not be overlapped with each other, and are separately positioned with each other in the horizontal direction and thereby forming openings 60 therebetween.

In addition, in the rails 31A of the anode side separator 30A, the top portions 35 of the second linear portions 33 are located so as to be away from the flat portions 36 on the cathode side separator 30B. In the rails 31B of the cathode side separator 30B, the top portions 35 of the second linear portions 33 are located so as to be away from the flat portions 36 on the anode side separator 30A. With this configuration, the cooling water passages 53 formed between the anode side separator 30A and the cathode side separator 30B are terminated in the horizontal direction at portions where the first linear portions 32 of the rails 31A and 31B join with each other. On the other hand, the cooling water passages 53 communicate in the in the horizontal direction at portions where the second linear portions 33 of the rails 31A and 31B exist.

As a result, the cooling water introduced from the cooling water supplying ports 15 to the cooling water passages 53 flows meandering in the horizontal direction so as to pass through paths formed between the second linear portions 33 of the rails 31A and the second linear portions 33 of the rails 31B, and thereafter flows into the corresponding cooling water discharging ports 16. Accordingly, the fuel gas and the oxidant gas flow in the vertical direction while the cooling water flows in the horizontal direction which is orthogonal to the flow direction of these reaction gasses.

In the fuel cell stack S (i.e., in the unit cell 10), hydrogen ions generated by a catalytic reaction at the anode 22 pass the solid polymer electrolyte membrane 21 and travel to the cathode 23, where electricity is generated by the electrochemical reaction with the oxygen and water is produced. Heat accompanied by this electrical power generation is cooled by the cooling water flowing through the cooling water passages 53 such that temperature of the unit cell 10 will not exceed the predetermined operating temperature thereof.

In this fuel cell stack S, when there is a necessity to discharge the cooling water in the fuel cell stack S for maintenance or the like, the cooling water within the fuel cell stack S can be easily and almost completely discharged by removing a non-illustrated plug closing the cooling water draining hole 99 of the end plate 90A. This can be done because: the air draining penetration holes 8 and the communication holes for draining cooling water 9 communicate with the cooling water passages 53 of all of the unit cells 10; the air draining penetration hole 8 is open to atmosphere through the cooling water reservoir tank; the communication hole for draining cooling water 9 is located at a position where is under the lowermost portions of the communication hole for draining cooling water 9, the communication holes 5 for supplying cooling water, the communication holes 6 for discharging cooling water, and the cooling water passages 53, and where is at the lowermost position of the groove 53b; and the air draining penetration hole 8 is located at a position where is above the uppermost portions of the communication holes 5 for supplying cooling water, the communication holes 6 for discharging cooling water, the cooling water passages 53, and where is at the uppermost position of the groove 53a.

Since the cooling water falls down along the inclining portion 37a of the upper buffering portion 37, the cooling water will not remain at a position above the upper buffering portion 37. In addition, substantially whole of the cooling water inside the fuel cell stack S can be introduced into the communication hole for draining cooling water 9 through the groove 53b formed along the inclining portions 40a of the lower buffering portion 40.

While in an initialization after assembling of the fuel cell stack S, or while charging coolant into the cooling water passages 53 after draining off the cooling water within the fuel cell stack S, it is possible to easily and almost completely discharge air remaining inside the cooling water passages 53 of all of the unit cells 10, by connecting the air draining hole 98 and the cooling water draining hole 99 of the end plate 90A to the cooling water reservoir tank, and by supplying the cooling water from the cooling water supplying port 95. This can be done because: the air draining penetration holes 8 communicate with the cooling water passages 53 of all of the unit cells 10; the air draining penetration holes 8 are located at a positions where are higher than the uppermost positions of the communication holes 5 for supplying cooling water, the communication holes 6 for discharging cooling water, and the cooling water passages 53, and where are the uppermost portion of the grooves 53a; and air-and-liquid separation is performed in the upper buffering portion 37.

In addition, since air can travel upward along the inclining portion 40a of the lower buffering portion 40, air will not remain in the lower portion of the lower buffering portion 40. Therefore, substantially whole of air within the cooling water passages 53 can be introduced into the air draining penetration hole 8 through the groove 53a formed in the inclining portion 37a of the upper buffering portion 37.

Furthermore, if air is mixed in the cooling water during the normal operations, the air-and-liquid separation is performed in the upper buffering portion 37; therefore, the air removed from the cooling water can be discharged into the cooling water reservoir tank through the air draining penetration hole 8.

As has been explained in the above, since air remaining in the cooling water passages 53 of the fuel cell stack S can be substantially eliminated, the heat exchanging efficiency will improve, and thereby increasing the cooling performance.

Another Embodiment

Moreover, the present invention will not limited only by the above embodiment.

For example, in the above embodiment, the coolant passages are provided at all positions between the adjacent two unit cells; however, the coolant passages may not be provided at all positions between the adjacent two unit cells (i.e., the coolant passages may be provided some of them). In this case, at a portion where the coolant passage is omitted, the adjacent two unit cells will commonly own one separator, and the separator will work as the anode side separator for one of the unit cells while the separator will work as the cathode side separator for another of the unit cells.

In addition, in the above embodiment, a construction of stacking the wave-shaped separators are employed in order to cross the flow direction of the reactant gasses and the flow direction of the coolant; however, the present invention is not limited only to this construction. That is, any other constructions may be employed instead of it if only the flow direction of the reactant gasses and the flow direction of the coolant can cross with each other.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell stack comprising:
    a plurality of unit fuel cells stacked with each other, each of the unit fuel cells being formed by disposing separators so as to make close contacts with anodes and cathodes of membrane electrode assemblies, and each of the membrane electrode assemblies being formed by disposing the anode and the cathode on both sides of an electrolyte membrane;
    a reactant gas passage formed by a space between the separators and the anode and the cathode;
    a coolant passage formed between the separators by disposing at least one of the separators so as to make a close contact with another of the separators;
    a reactant-gas-supplying penetration hole and a reactant-gas-discharging penetration hole each communicating with the reactant gas passage and each penetrates the unit fuel cells in a stacking direction thereof; and
    a coolant-supplying penetration hole formed along a first side of the unit fuel cell and a coolant-discharging penetration hole formed along a second side of the unit fuel cell opposite the first side, each of said holes communicating with the coolant passage and each of said holes penetrating the unit fuel cells in a stacking direction thereof, wherein
    the coolant-supplying penetration hole and the coolant-discharging penetration hole are arranged in a horizontal direction opposing with each other so as to sandwich a power generating region therebetween; and
    the fuel cell stack further comprising:
        an air draining penetration hole formed along a third side of the unit fuel cell communicating with the coolant passage and arranged such that at least one part thereof is located at a higher position than an uppermost position of the coolant supplying penetration hole and the coolant-discharging penetration hole, and penetrates the unit fuel cells in the stacking direction; and
        a coolant draining penetration hole formed along a fourth side of the unit fuel cell opposite the third side and different from the first and second sides, the coolant draining penetration hole communicating with the coolant passage and arranged such that at least one part thereof is located at a lower position than a lowermost position of the coolant-supplying penetration hole and the coolant-discharging penetration hole, and penetrates the unit fuel cells in the stacking direction.

2. The fuel cell stack according to claim 1, wherein
the reactant gas supplying penetration hole and the reactant-gas-discharging penetration hole are arranged in the vertical direction opposing with each other so as to sandwich the power generating region therebetween;
an upper buffering portion and a lower buffering portion each diffuses and rectifies the reactant gas are disposed between the reactant gas supplying penetration hole and the power generating region, and between the reactant-gas-discharging penetration hole and the power generating region;
the coolant-supplying penetration hole and the coolant-discharging penetration hole are arranged between the upper buffering portion and the lower buffering portion; and
the air draining penetration hole is located at a higher position than the upper buffering portion, while the coolant draining penetration hole is located at a lower position than the lower buffering portion.

3. The fuel cell stack according to claim 2, wherein
each of the upper buffering portion and the lower buffering portion includes an inclining portion inclined with respect to the vertical direction; and
each of the air draining penetration hole and the coolant draining penetration hole is disposed around lower ends of the inclining portions.

4. The fuel cell stack according to claim 1, wherein each of the separators has a point- symmetric shape.

5. The fuel cell stack according to claim 1, wherein a first unitary buffering section is disposed along the third side of the unit fuel cells, and a second unitary buffering section opposite the first unitary buffering section is disposed along the fourth side opposite the third side,
wherein the first and second sides are free of buffering sections.

6. The fuel cell stack according to claim 5, wherein the third side comprises an oxidant gas supplying penetration hole and a fuel gas supplying penetration hole, and the fourth side opposite the third side includes an oxidant gas discharging penetration hole and a fuel gas discharging penetration hole.

7. The fuel cell stack according to claim 6, wherein the first unitary buffering section has a length that extends in a horizontal direction along substantial portions of both the oxidant gas supplying penetration hole and the fuel gas supplying penetration hole.

8. The fuel cell stack according to claim 6, wherein the second unitary buffering section has a length that extends in a horizontal direction along substantial portions of both the oxidant gas discharging penetration hole and the fuel gas discharging penetration hole.

9. The fuel cell stack according to claim 6, wherein the air draining penetration hole is disposed between the oxidant gas supplying penetration hole and the fuel gas supplying penetration hole, and vertically above the first unitary buffering section.

10. The fuel cell stack according to claim 9, wherein the air draining penetration hole is disposed vertically above a central portion of the first unitary buffering section.

11. The fuel cell stack according to claim 9, wherein the coolant draining penetration hole is disposed between the oxidant gas discharging penetration hole and the fuel gas discharging penetration hole, and vertically below the second unitary buffering section.

12. The fuel cell stack according to claim 11, wherein the coolant draining penetration hole is disposed vertically below a central portion of the second unitary buffering section.

13. The fuel cell stack according to claim 5, wherein the coolant-supplying penetration hole formed along the first side of the unit fuel cells and the coolant-discharging penetration hole formed along the second side of the unit fuel cells are disposed vertically between the first unitary buffering section and the second unitary buffering section.

14. The fuel cell stack according to claim 5, wherein said first and second unitary buffering sections include a plurality of inclined surfaces.

* * * * *